United States Patent [19]
Kolzer

[11] Patent Number: 5,698,289
[45] Date of Patent: Dec. 16, 1997

[54] COMPRESSED LIGHT FILLER MATERIAL FOR REINFORCED DUROPLASTIC COMPOSITES AND PROCESS FOR PRODUCING IT

[76] Inventor: Klaus Kolzer, Benrather Schlossufer 65B, 40593 Dusseldorf, Germany

[21] Appl. No.: 557,488

[22] Filed: Nov. 14, 1995

[30] Foreign Application Priority Data

Nov. 15, 1994 [EP] European Pat. Off. .............. 94118019

[51] Int. Cl.$^6$ ....................................... B32B 3/06
[52] U.S. Cl. .................. 428/102; 428/308.4; 428/311.5; 428/317.9; 428/402; 428/902
[58] Field of Search .................................. 428/102, 402, 428/402.2, 406, 300, 283, 281, 253, 308.4, 311.5, 317.9, 902

[56] References Cited

U.S. PATENT DOCUMENTS

| | | | |
|---|---|---|---|
| 4,935,294 | 6/1990 | Misevich et al. | 428/406 |
| 5,571,592 | 11/1996 | McGregor et al. | 428/283 |

*Primary Examiner*—James J. Bell
*Attorney, Agent, or Firm*—Arthur G. Yeager

[57] ABSTRACT

Light filler material consists of a bonded, woven or knitted, short- or long-fibered material web into which thermoplastic hollow microglobes are embedded. This voluminized fiber web is compressed by means of a sewing or stitch-bonding process with the aid of pre-tensioned sewing threads. In the process, the hollow spaces between the voluminized microglobes are reduced in an exactly calculable form by the adjustable thread tension.

19 Claims, 1 Drawing Sheet

FIBERS    FILLER MATERIAL UNCOMPRESSED
(ROUND HOLLOW MICROGLOBES)

SEWING THREAD    FIBERS    FILLER MATERIAL COMPRESSED
(DEFORMED HOLLOW MICROGLOBES)

COMPRESSED LIGHT FILLER MATERIAL FOR REINFORCED DUROPLASTIC COMPOSITES AND PROCESS FOR PRODUCING IT

BACKGROUND OF THE INVENTION

The invention relates to a flat light filler material for reinforced duroplastic, such as the classic aminoplastic resins, epoxide resins, polyurethane resins, unsaturated polyester resins and other reaction resins. The filler material consists of a fiber-like flat formed body in which closed-cell thermoplastic hollow microglobes, also called "microspheres", are embedded. Formed fiber bodies of this type are used to increase the handling and sturdiness properties of formed plastic parts. It is possible to replace a portion of the resin by formed fiber bodies in which hollow microglobes have been embedded, to reduce the weight of formed plastic parts without loss of mechanical sturdiness, as well as to reduce the resin portion and the specific weight.

Corresponding flat filler materials, consisting of fiber webs enriched with expanded hollow microglobes, are known and described in DE-C-24 33 427, U.S. Pat. No. 3,376,288 or P 36 80 292.1-08. With these materials mentioned there, fiber-like flat formed bodies (formed fabrics, felt, fabrics, layments), consisting of organic (for example polyester, polyamide) or inorganic fibers (for example glass fibers), are filled with a defined volume proportion of thermoplastic hollow microglobes. Commercially available hollow microglobes consist of, for example, a polymer of vinylidene chloride or of mixed polymer such as acrylnitril and- or other monomers.

The introduction of the hollow microglobes into the fiber-like flat formed body takes place by impregnation or depulping of the unexpanded, fine-grained pre-stage of these globules in the form of an aqueous dispersion into the flat fiber material. Impregnation can take place in a dipping bath, by a spraying process or by foam impregnation. The amount of microglobules to be introduced in relation to a defined area is based on the desired material thickness of the finished flat formed body. With commercially available thermoplastic hollow microglobes which, in the unexpanded state, have a particle size of approximately 5 to 20 and in the expanded state of 20 to 100 microns, approximately 8 to 15 g per m$^2$ are required for a material thickness of approximately 1 mm. The flat formed body impregnated in this way is subsequently subjected to a thermal process, wherein the water in the dispersion is removed as well as the still unexpanded microglobules are caused to expand. This takes place in temperature ranges between approximately 100° to 150° C.

This expansion is caused in that a propellant gas (for example isobutane) contained in the unexpanded microglobules expands under the effect of temperature and pushes the thermoplastic material apart. The extent of the expansion and the diameter resulting therefrom is determined by the amount of the imbedded propellant gas. The expansion comes to a halt when the propellant gas is used up and the interior pressure of the hollow microglobes and the exterior pressure are balanced. As a rule, the exterior pressure corresponds to atmospheric pressure. The results are exactly globe-shaped, closed-cell hollow bodies of a diameter of approximately 20 to 100 microns. Fixation in place of the hollow microglobes in the fiber-like formed flat body can take place by means of a binding agent or a thermal sintering process.

Globules of different diameters (20 to 100 micron) are created in this expansion process, which lie closely together and, in accordance with their sieve fraction and the "packing factor" resulting therefrom, form a defined relationship between the volume of the hollow globes and the open spaces formed between these hollow globes, as long as the expansion can take place unhampered and not under pressure. The total volume generated in this way can only be minimally affected and approximately corresponds to the bulk factor, if the same hollow globules were to be poured loosely into a vessel. In actual use the volume of the open spaces between the globes is approximately 50 to 80%. The amount of resin which can be absorbed by the above described filler material after impregnation results from this.

Such filler materials are used in actuality as so-called laminable core materials, in that these core materials are laminated with cover laminations, located on the outside, of pure reinforcement fibers of glass, aramid, carbon and the like, which are impregnated with the same resins. Sandwich-like, fiber-reinforced formed parts are created by this, whose outstanding characteristic is great sturdiness with low weight. Since, as already mentioned above, the resin absorption capability of such core materials is more or less predetermined by the manufacturing process of the light filler material and the properties of the hollow microglobes and can be affected only to a small degree, it is not possible to fall below defined specific weights by further reduction of the resin portion.

SUMMARY OF THE INVENTION

It is the object of the invention to reduce the existing, resin-absorbing hollow spaces within an exactly calculable order of magnitude by subjecting the voluminized fiber web to a mechanical compression process. In accordance with the invention this is achieved in that the material web is subjected to a stitch-bonding process and is compressed by interlaced sewing thread and is maintained in this compressed state. Commercially available sewing or stitch-bonding machines are suitable for this, which are used for example to produce stitch-bonded goods or to connect multi-layered material webs by sewing thread.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DESCRIPTION OF THE INVENTION

Figure 1:
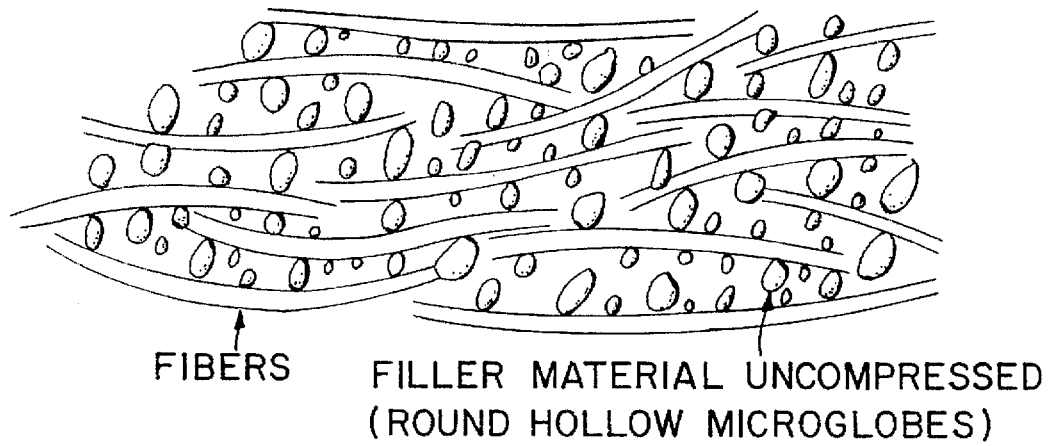
FIG. 1 is a representation of the uncompressed fibers and filler material of round hollow microglobes in accord with the prior art.
Figure 2:
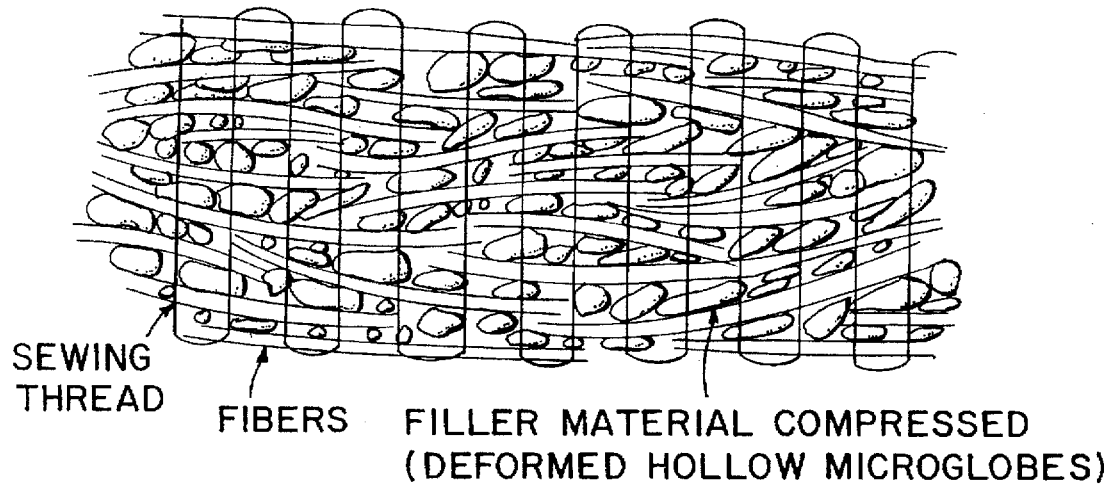
FIG. 2 is a representation of the compressed fibers and filler material of deformed hollow microglobes with sewing threads maintaining the web in its compressed state in accord with this invention.

The compression of the voluminized fiber materials is only possible if the hollow microglobes consist of an elastic plastic material which can be deformed by pressure. Since the volume of the hollow globules can only be reduced insignificantly or not at all by pressure, portions of the deformed hollow globules creep into the open spaces and reduce this volume. This means that in the course of compressing a fiber material filled with hollow globules, the volume reduction has an exclusive effect on the area of the hollow spaces between the globes.

If a fiber material enriched with hollow globules in accordance with the invention of an assumed volume portion of 50% of hollow globes and an assumed total volume of 100% is reduced to 70%, the compression of 30% affects only the portion of the 50% of the hollow spaces and reduces this portion by ⅔. This means that a material modified in this way has a resin absorption reduced by ⅔ in comparison with a non-compressed material. This leads to a considerable savings in resin costs and weight.

It is known to combine the above described light filler materials into complexes of two or many layers by means of a sewing or stitch-bonding process by combining them with other material webs, for example fabrics, stitch-bonded goods or formed fabrics, in order to make a layment available to the processor which is ready to be processed, wherein the number of work steps can be reduced in comparison with the placement of individual material webs. However, this only involves a mechanical fixation of the individual material webs which, as a rule, should be as loose as possible in order not to reduce the capability to drape them in case of spherical deformations.

It is not known to employ a sewing or stitch-bonding process by appropriate tension of the sewing thread in order to compress a fiber web enriched with hollow globes into an exactly calculable shape. In accordance with the invention the fiber-like light filler materials are either supplied uncompressed to the sewing station and are only pressed together by means of an adjustable pre-tension of the sewing threads, or they are mechanically pre-compressed immediately ahead of the sewing station if particularly high compression degrees are to be achieved. Actual use has shown that fiber-like light filler materials of this type retain an excellent air and resin drainage, even though the capillaries had been narrowed by pressure. This is caused by the sewing channels and sewing thread vertically drawn through the material web, which aid ventilation and improve the resin flow. This effect can be improved to the extent that the stitch distance between the sewing threads is reduced. It is also possible to produce a light filler material compressed in this way from two or several layers of the same type of material or from combinations with materials of different character.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A light filler material comprising a substrate material of organic or inorganic fibers, with embedded elastic hollow microglobes consisting of a thermoplastic material, which is connected with the fibers by means of chemical binding agents or by thermal adhesion, the improvement wherein said light filler material is reduced in its initial volume by compression and thereafter subjected to mechanical means to maintain said light filler material in compression, said mechanical means including organic or inorganic sewing threads forming seams and being maintained in tension by said compressed light filler material.

2. The light filler material in accordance with claim 1, characterized in that the substrate material consists of tissue, felt, fabrics, layments or knit fabrics with a weight per unit area of 5 to 500 grams.

3. The light filler material in accordance with claim 1 or 2 characterized in that the fibers consist of short fibers of a length of 2 to 70 mm or of continuously drawn filaments.

4. The light filler material in accordance with claim 1 or 2, characterized in that the fibers consist of high-module fibers, from the group consisting of glass fibers, carbon fibers, stretched PE fibers, and aramid fibers.

5. The light filler material in accordance with claim 1 or 2, characterized in that said chemical binding agents are added to said substrate material in an amount of 5 to 300 weight-percent of the contained hollow globes.

6. The light filler material in accordance with claim 1 or 2, characterized in that the hollow microglobes have a diameter of 20 to 100 microns and have a weight proportion of 3 to 40 grams per $m^2$/per millimeter of light filter material thickness.

7. The light filler material in accordance with claim 1 or 2 characterized in that the volume proportion of said hollow microglobes is 10% to 60% of the uncompressed substrate material.

8. The light filler material in accordance with claim 1 or 2, characterized in that the volume proportion of the hollow microglobes is 50% to 95% of the compressed light filler material.

9. The light filler material in accordance with claim 1 or 2, characterized in that said seams consist of individual seams.

10. The light filler material in accordance with claim 1 or 2, characterized in that the sewing threads cross alternatingly and said seams are connected with each other in the shape of a grid.

11. The light filler material in accordance with claim 1 or 2 characterized in that the uncompressed material consists of a single layer.

12. The light filler material in accordance with claim 1 or 2 characterized in that the uncompressed light filler material consists of at least two layers, said at least two layers having different compositions of the quality and the weight per unit area of the fibers and hollow microglobes.

13. The light filler material in accordance with claim 2 or 2 characterized in that the compression of the light filler material is 5% to 50% of the total initial thickness.

14. The light filler material in accordance with claim 1 or 2 characterized in that the absorption capability of synthetic resin liquids is reduced by the compression process from an initial quantity of 100% without compression continuously down to 5% with very high compression.

15. The light filler material in accordance with claim 1 characterized in that in the compressed state the material has a thickness of 2 to 50 mm.

16. A light filler material, without any supporting outer sheets, consisting essentially of a substrate material of organic of inorganic fibers, with embedded elastic hollow microglobes of a thermoplastic material, said microglobes being connected with said fibers by means of chemical binding agents or by thermal adhesion, said substrate material being reduced in its initial volume by compression, and thereafter subjected to means for maintaining said substrate material with its embedded microglobes in compression.

17. The light filler material in accordance with claim 16, characterized in that said means to maintain said material in compression includes organic or inorganic sewing threads maintained in tension by said compressed material.

18. The light filler material in accordance with claim 17, characterized in that the seams consist of individual seams.

19. The light filler material in accordance with claim 17, characterized in that the sewing threads cross alternatingly and said seams are connected with each other in the shape of a grid.

* * * * *